United States Patent
Shimura et al.

(10) Patent No.: US 9,508,088 B2
(45) Date of Patent: Nov. 29, 2016

(54) ADVERTISEMENT DELIVERY MANAGEMENT APPARATUS AND ADVERTISEMENT DELIVERY MANAGEMENT METHOD

(71) Applicant: YAHOO JAPAN CORPORATION, Tokyo (JP)

(72) Inventors: Kazuhiko Shimura, Tokyo (JP); Koji Tsukamoto, Tokyo (JP); Akira Tajima, Tokyo (JP); Hiroyuki Kato, Tokyo (JP); Takenobu Dei, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 359 days.

(21) Appl. No.: 14/094,198

(22) Filed: Dec. 2, 2013

(65) Prior Publication Data
US 2014/0164107 A1  Jun. 12, 2014

(30) Foreign Application Priority Data

Dec. 11, 2012  (JP) .................................. 2012-270605

(51) Int. Cl.
*G06Q 30/02*  (2012.01)

(52) U.S. Cl.
CPC ................................ *G06Q 30/0254* (2013.01)

(58) Field of Classification Search
CPC ....................... G06Q 30/0254; G06Q 30/0251
USPC ..................................................... 705/14.52
See application file for complete search history.

(56) References Cited

U.S. PATENT DOCUMENTS

| | | | |
|---|---|---|---|
| 2008/0300964 A1* | 12/2008 | Raghunandan | G06Q 30/02 705/14.66 |
| 2009/0132346 A1 | 5/2009 | Duggal et al. | |
| 2010/0082402 A1 | 4/2010 | Kantak et al. | |
| 2010/0161419 A1 | 6/2010 | Tomlin | |
| 2010/0185484 A1 | 7/2010 | Sordo et al. | |
| 2011/0161162 A1 | 6/2011 | Ketchum | |
| 2011/0251875 A1 | 10/2011 | Cosman | |

(Continued)

FOREIGN PATENT DOCUMENTS

| | | |
|---|---|---|
| JP | A-9-91358 | 4/1997 |
| JP | A-2001-265810 | 9/2001 |

(Continued)

OTHER PUBLICATIONS

Jun. 3, 2014 Office Action issued in Japanese Application No. 2012-270219 (with translation).

(Continued)

*Primary Examiner* — Namrata Boveja
*Assistant Examiner* — Robert C Johnson
(74) *Attorney, Agent, or Firm* — Oliff PLC

(57) ABSTRACT

An advertisement delivery management apparatus according to an embodiment includes an acquisition unit, a determination unit, and an accepting unit. The acquisition unit acquires information on two or more types of delivery target user groups, each including a plurality of delivery target users predicted as future advertisement delivery destinations. The determination unit determines whether each of the delivery target user groups satisfies delivery conditions designated by an advertisement delivery order request. The accepting unit accepts the advertisement delivery order request based on the determination result of the determination unit.

10 Claims, 6 Drawing Sheets

(56) References Cited

U.S. PATENT DOCUMENTS

2011/0258045 A1    10/2011    Chickering et al.
2012/0041817 A1    2/2012    Priyadarshan et al.

FOREIGN PATENT DOCUMENTS

| | | |
|---|---|---|
| JP | A-2001-297251 | 10/2001 |
| JP | 2001-325505 A | 11/2001 |
| JP | A-2001-306439 | 11/2001 |
| JP | A-2002-41670 | 2/2002 |
| JP | A-2003-6518 | 1/2003 |
| JP | A-2003-67290 | 3/2003 |
| JP | A-2005-196777 | 7/2005 |
| JP | A-2007-200168 | 8/2007 |
| JP | A-2009-163425 | 7/2009 |
| JP | A-2011-238020 | 11/2011 |
| JP | 2012-043193 A | 3/2012 |
| JP | A-2012-108663 | 6/2012 |
| WO | WO 02/061619 A1 | 8/2002 |

OTHER PUBLICATIONS

Jun. 17, 2014 Office Action issued in Japanese Application No. 2012-258777 (with translation).
Jun. 17, 2014 Office Action issued in Japanese Application No. 2012-258788 (with translation).
Dec. 16, 2015 Office Action issued in U.S. Appl. No. 14/103,406.
Jun. 16, 2015 Office Action issued in Japanese Patent Application No. 2014-126340.
Japanese Office Action issued in Japanese Application No. 2012-270605 mailed Jun. 3, 2014 (with translation).
Japanese Office Action issued in Japanese Application No. 2012-282033 mailed May 20, 2014 (with translation).
Mar. 11, 2015 Office Action issued in U.S. Appl. No. 14/103,406.
Mar. 23, 2016 Office Action issued in U.S Appl. No. 14/086,489.
Mar. 24, 2016 Office Action issued in U.S Appl. No. 14/086,604.
Mar. 29, 2016 Office Action issued in Japanese Patent Application No. 2014-126340.
Jun. 10, 2016 Office Action issued in U.S. Appl. No. 14/107,428.
May 2, 2016 Office Action issued in U.S. Appl. No. 14/097,563.

* cited by examiner

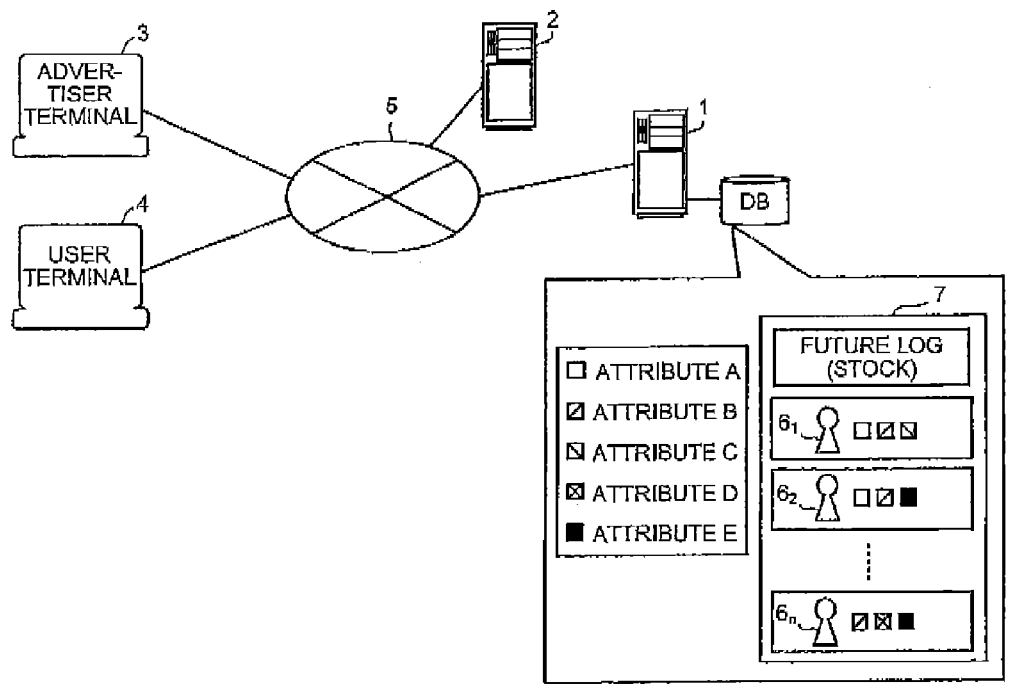
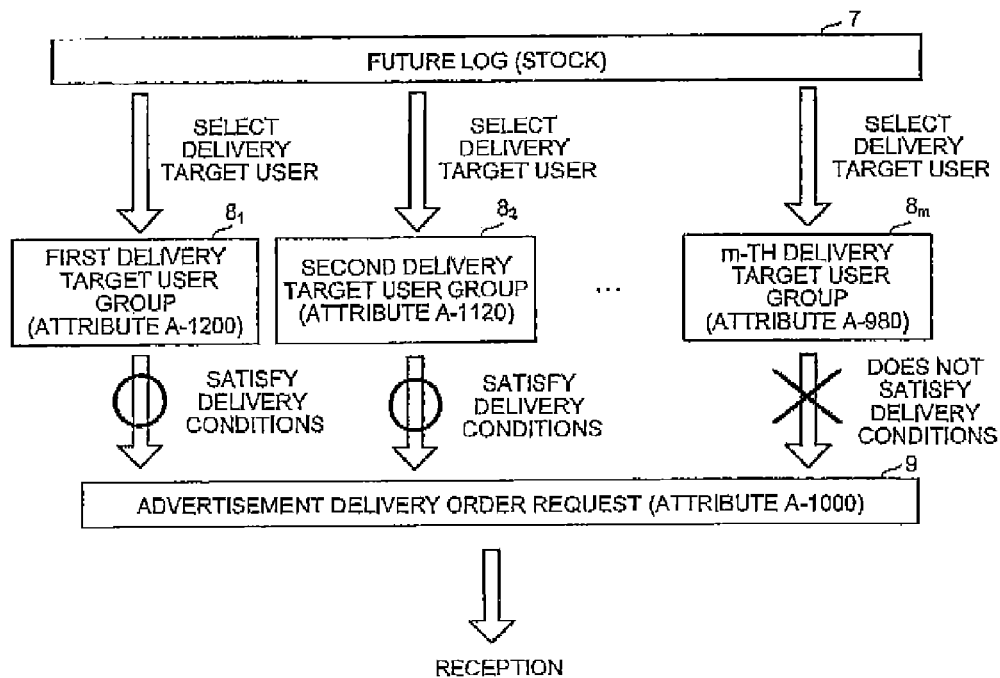

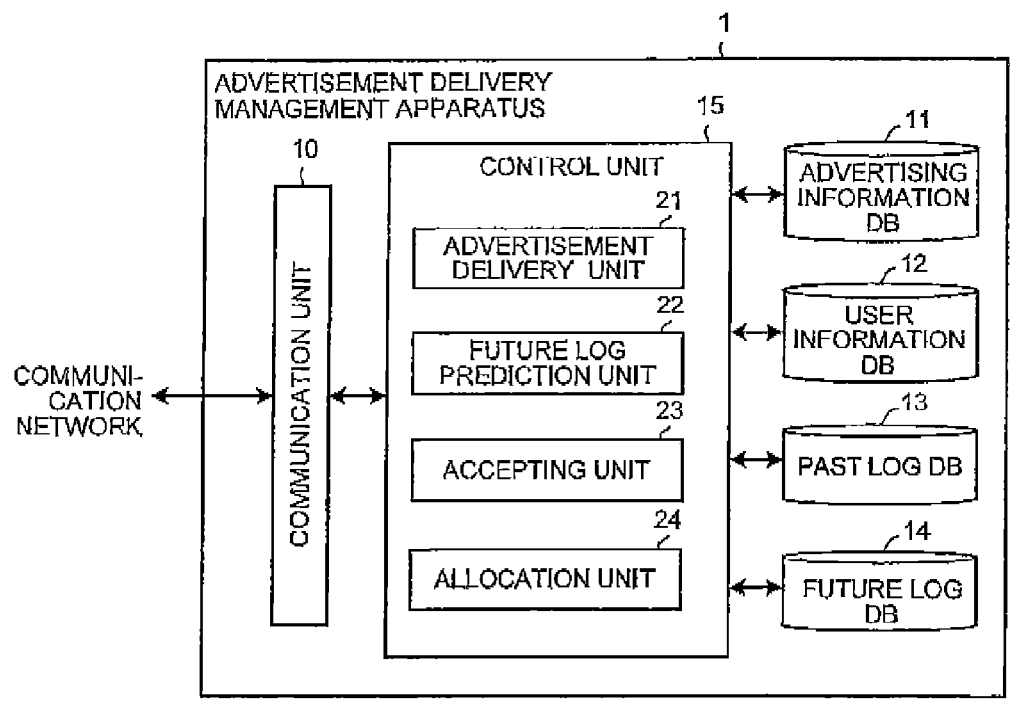

FIG.4

| USER ID | PSYCHOGRAPHIC ATTRIBUTES | | | | | DEMOGRAPHIC ATTRIBUTES | | |
|---|---|---|---|---|---|---|---|---|
| | VEHI-CLE | COSME-TICS | CLOTH-ES | TRA-VEL | ... | SEX | AGE | ... |
| U0001 | 1 | 0 | 0 | 1 | ... | 2 | 21 | ... |
| U0002 | 0 | 0 | 1 | 0 | ... | 1 | 44 | ... |
| ⋮ | ⋮ | ⋮ | ⋮ | ⋮ | ⋮ | ⋮ | ⋮ | ⋮ |

FIG.5

| DATE AND TIME | USER ID |
|---|---|
| 12/1/2013 6:11:05 | U0001 |
| 12/1/2013 6:11:06 | U0102 |
| 12/1/2013 6:12:08 | U0082 |
| 12/1/2013 6:12:44 | U0001 |
| 12/1/2013 6:13:02 | U0102 |
| 12/1/2013 6:13:21 | U0082 |
| ⋮ | ⋮ |

FIG.6

| DIST-RIBUTION TARGET ID | ALLO-CATION STATE | PSYCHOGRAPHIC ATTRIBUTES | | | | | DEMOGRAPHIC ATTRIBUTES | | |
|---|---|---|---|---|---|---|---|---|---|
| | | VEHI-CLE | COSME-TICS | CLOTH-ES | TRA-VEL | ... | SEX | AGE | ... |
| F0001 | 0 | 0 | 1 | 0 | 1 | ... | 1 | 54 | ... |
| F0002 | 1 | 0 | 0 | 1 | 1 | ... | 2 | 22 | ... |
| F0003 | 0 | 0 | 0 | 0 | 0 | ... | 2 | 32 | ... |
| F0004 | 0 | 1 | 0 | 0 | 0 | ... | 1 | 21 | ... |
| F0005 | 1 | 0 | 0 | 1 | 1 | ... | 2 | 32 | ... |
| F0006 | 0 | 1 | 1 | 1 | 1 | ... | 1 | 21 | ... |
| ⋮ | ⋮ | ⋮ | ⋮ | ⋮ | ⋮ | ⋮ | ⋮ | ⋮ | ⋮ |

FIG.7

| FIRST DELIVERY TARGET USER GROUP | SECOND DELIVERY TARGET USER GROUP | ... | m-TH DELIVERY TARGET USER GROUP |
|---|---|---|---|
| F0001 | F0003 | ... | F0001 |
| F0003 | F0006 | ... | F0004 |
| F0004 | F0009 | ... | F0006 |
| F0006 | F0011 | ... | F0009 |
| ⋮ | ⋮ | ⋮ | ⋮ |

FIG.8

| DELIVERY TARGET ID | NUMBER OF USER ATTRIBUTES |
|---|---|
| F0001 | 4 |
| F0003 | 2 |
| F0004 | 3 |
| F0006 | 6 |
| TOTAL NUMBER OF USER ATTRIBUTES | 15 |

ADVERTISEMENT DELIVERY MANAGEMENT APPARATUS AND ADVERTISEMENT DELIVERY MANAGEMENT METHOD

CROSS-REFERENCE TO RELATED APPLICATIONS

The present application claims priority to and incorporates by reference the entire contents of Japanese Patent Application No. 2012-270605 filed in Japan on Dec. 11, 2012.

BACKGROUND OF THE INVENTION

1. Field of the Invention

The present invention relates to an advertisement delivery management apparatus and an advertisement delivery management method.

2. Description of the Related Art

In recent years, with the rapid spread of a network, such as the Internet, advertisements have been actively delivered through the network. As an aspect of the delivery of the advertisements, display advertising has been known which displays image or video advertisements in a predetermined space of a page (hereinafter, referred to as an advertisement delivery target page) which is an advertisement delivery target.

In the display advertising, advertisements are delivered to a user who has user attributes (for example, sex, age, and favorite) designated by an advertiser. Therefore, advertisements are effectively delivered (for example, see Japanese Laid-open Patent Publication No. 2011-238020).

In the delivery of the advertisements, when the user who has accessed the advertisement delivery target page has the user attributes designated by the advertiser, advertisements are delivered. Therefore, it is preferable to predict a delivery target user, who will be the future advertisement delivery destination, as a future log and to accept an order from the advertiser on the basis of the future log.

However, it is difficult to accurately predict the delivery target user, who will be the future advertisement delivery destination, so as to be identical to the user who actually accesses the advertisement delivery target page. Therefore, it is difficult to perform a process of accepting an advertisement delivery order request with high accuracy.

SUMMARY OF THE INVENTION

According to an exemplary embodiment, an advertisement delivery management apparatus includes an acquisition unit, a determination unit, and an accepting unit. The acquisition unit acquires information on two or more types of delivery target user groups, each including a plurality of delivery target users predicted as future advertisement delivery destinations. The determination unit determines whether each of the delivery target user groups satisfies delivery conditions designated by an advertisement delivery order request. The accepting unit accepts the advertisement delivery order request based on the determination result of the determination unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 1A and 1B are diagrams illustrating an advertisement delivery management process according to an embodiment;

FIG. 2 is a diagram illustrating the structure of an advertisement delivery management apparatus according to the embodiment;

FIG. 3 is a diagram illustrating an example of an advertising information table;

FIG. 4 is a diagram illustrating an example of a user information table;

FIG. 5 is a diagram illustrating an example of an access log table;

FIG. 6 is a diagram illustrating an example of a future log table;

FIG. 7 is a diagram illustrating an example of a delivery target user group table;

FIG. 8 is a diagram illustrating a method of calculating the total number of user attributes.

DETAILED DESCRIPTION OF THE PREFERRED EMBODIMENTS

Figure 9:
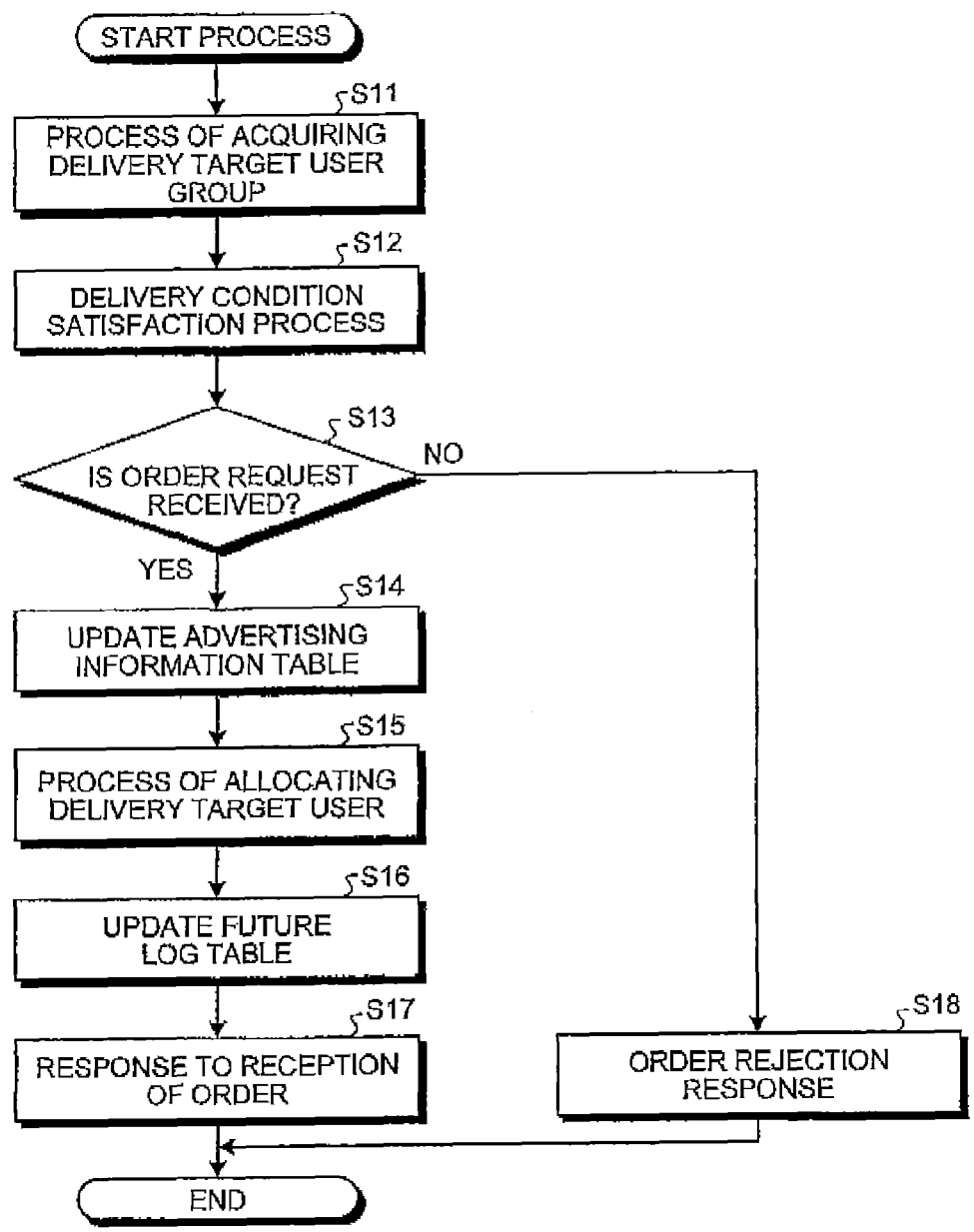
FIG. 9 is a diagram illustrating the flow of the advertisement delivery management process of the advertisement delivery management apparatus according to the embodiment.

Hereinafter, an advertisement delivery management apparatus and an advertisement delivery management method according to an exemplary embodiment (hereinafter, referred to as an "embodiment") of the present disclosure will be described in detail with reference to the accompanying drawings. The advertisement delivery management apparatus and the advertisement delivery management method according to the present disclosure are not limited by the embodiment. In the following description, in some cases, a "database" is described as a "DB".

1. Advertisement Delivery Management Process

First, an advertisement delivery management process according to an embodiment will be described. FIGS. 1A and 1B are diagrams illustrating the advertisement delivery management process according to the embodiment. The advertisement delivery management process makes it possible to perform a process of accepting orders from the advertiser with high accuracy.

As illustrated in FIG. 1A, an advertisement delivery management system according to the embodiment includes an advertisement delivery management apparatus 1, an information delivery apparatus 2, an advertiser terminal 3, and a user terminal 4. The advertisement delivery management apparatus 1, the information delivery apparatus 2, the advertiser terminal 3, and the user terminal 4 are connected to each other through a communication network 5. The communication network 5 is an Internet protocol (IP) network, such as the Internet. In practice, there are a plurality of advertiser terminals 3 and a plurality of user terminals 4. However, FIG. 1A illustrates one advertiser terminal 3 and one user terminal 4, for convenience of explanation.

The advertiser terminal 3 is a terminal apparatus of the advertiser who wants to deliver advertisements and sends an order (hereinafter, referred to as an order request) for the advertisements to be delivered to the user terminal 4 of the user with predetermined user attributes to the advertisement delivery management apparatus 1. Specifically, the advertiser terminal 3 transmits, to the advertisement delivery management apparatus 1, the order request including advertising information which the advertiser wants to post on an advertisement delivery target page and information on the designated user attributes as the delivery destinations. Examples of the advertising information include two-dimensional content and three-dimensional content, such as banner advertisements, text advertisements, and video advertisements.

The user terminal 4 is the terminal apparatus of the user who accesses the advertisement delivery management apparatus 1 and the information delivery apparatus 2. When the information delivery apparatus 2 is accessed by the user terminal 4, for example, it transmits an advertisement delivery target page, such as a Web page, to the user terminal 4. The advertisement delivery target page includes the uniform resource locator (URL) of the advertising information. The user terminal 4 requests the advertisement delivery management apparatus 1 to transmit advertising information on the basis of the URL. When receiving the request for the advertising information from the user terminal 4, the advertisement delivery management apparatus 1 transmits advertising information corresponding to the request to the user terminal 4. The URL of the advertising information is not the URL of the advertisement delivery management apparatus 1, but may be the URL of the information delivery apparatus 2. In this case, the user terminal 4 requests the information delivery apparatus 2 to transmit advertising information on the basis of the URL of the advertising information. When receiving the request, the information delivery apparatus 2 requests the advertisement delivery management apparatus 1 to transmit advertising information to the user terminal 4. The advertisement delivery management apparatus 1 transmits advertising information corresponding to the transmission request from the information delivery apparatus 2 to the user terminal 4.

The advertisement delivery management apparatus 1 performs a process of accepting an advertisement delivery order request, a process of allocating user attributes corresponding to the accepted order request, and a process of delivering the advertising information designated by the order request to perform processes from the reception of the advertisement delivery order to the delivery of the advertising information.

The advertisement delivery management apparatus 1 stores information including the user attributes of a plurality of delivery target users, who are predicted as the future advertisement delivery destinations, as a future log (prediction information) in a DB and performs the process of accepting the order request on the basis of the future log.

In the example illustrated in FIG. 1A, information on delivery target users $6_1, 6_2, \ldots, 6_n$ (hereinafter, generically referred to as a delivery target user 6 in some cases) who are predicted as the future advertisement delivery destinations is stored in the DB. For example, the delivery target user $6_1$ has user attributes A to C and the delivery target user $6_2$ has user attributes A, B, and E. In addition, the delivery target user $6_n$ has user attributes B, D, and E.

The advertisement delivery management apparatus 1 repeatedly performs a process of randomly selecting a predetermined ratio R1 (for example, R1=0.8) of delivery target users to the delivery target users $6_1, 6_2, \ldots, 6_n$ to acquire information on two or more types of delivery target user groups. In the example illustrated in FIG. 1B, the advertisement delivery management apparatus 1 acquires information on different delivery target user groups $8_1, 8_2, \ldots, 8_m$ (hereinafter, generically referred to as a delivery target user group 8 in some cases) from a future log 7.

As illustrated in FIG. 1B, when receiving an advertisement delivery order request 9 from the advertiser terminal 3, the advertisement delivery management apparatus 1 determines whether each of the delivery target user groups $8_1$ to $8_m$ satisfies the delivery conditions designated by the order request 9.

The delivery conditions designated by the order request 9 include, for example, user attributes and the number of postings. For example, it is assumed that the user attribute is an "attribute A" and the number of postings is "1000". In addition, it is assumed that the number of delivery target users 6 having the "attribute A" as the user attribute is "1200" in the delivery target user group $8_1$, is "1120" in the delivery target user group $8_2$, and is "980" in the delivery target user group $8_m$.

In this case, the delivery target user groups 8 which satisfy the delivery conditions designated by the advertisement delivery order request 9 are, for example, the delivery target user groups $8_1$ and $8_2$. In contrast, the delivery target user group $8_m$ includes "980" delivery target users 6 having the user attribute A and does not satisfy "1000", which is the number of postings designated by the order request 9.

The advertisement delivery management apparatus 1 accepts the order request 9 when the ratio of the delivery target user groups 8 which satisfy the delivery conditions designated by the order request 9 to the delivery target user groups $8_1$ to $8_m$ is equal to or greater than a predetermined value R2 (for example, R2=0.9). On the other hand, when the ratio of the delivery target user groups 8 which satisfy the delivery conditions designated by the order request 9 is less than the predetermined value R2, the advertisement delivery management apparatus 1 does not accept the order request 9.

As such, the advertisement delivery management apparatus 1 determines whether to accept the order request 9 on the basis of whether delivery target user groups $8_1$ to $8_m$, each including a plurality of delivery target users 6 predicted as the future advertisement delivery destinations, satisfy the delivery conditions designated by the advertisement delivery order request 9. Therefore, it is possible to perform the process of determining whether the delivery conditions designated by the order request 9 are satisfied for a plurality of prediction patterns. As a result, it is possible to improve the reception accuracy of the order request 9, as compared to when the determination is performed for one prediction pattern.

In addition, the advertisement delivery management apparatus 1 randomly selects a predetermined ratio R1 of the delivery target users 6 to the delivery target users $6_1, 6_2, \ldots, 6_n$ included in the future log 7 to acquire information on delivery target user groups $8_1$ to $8_m$. Therefore, it is possible to easily generate different prediction patterns. In this embodiment, the delivery target users 6 are randomly selected. However, for example, the delivery target users 6 may be selected on the basis of a predetermined rule. In addition, plural types of future logs may be predicted and the plural types of future logs may be used as the delivery target user groups $8_1$ to $8_m$.

When the ratio of the delivery target user groups 8 satisfying the delivery conditions to the delivery target user groups $8_1$ to $8_m$ is equal to or greater than the predetermined value R2, the advertisement delivery management apparatus 1 accepts the advertisement delivery order request 9. Therefore, it is possible to further improve the reception accuracy of the order request 9. That is, as the number of delivery target user groups 8 increases, the ratio of the delivery target user groups 8 satisfying the delivery conditions designated by the order request 9 is reduced. As a result, there is a concern that the reception accuracy of the order request 9 will be reduced. However, it is possible to improve the reception accuracy of the order request 9 by adjusting the predetermined value R2.

Next, the detailed structure of the advertisement delivery management apparatus 1 which performs the above-mentioned advertisement delivery management process and the detailed content of the process will be described with reference to the drawings.

2. Structure of Advertisement Delivery Management Apparatus 1

FIG. 2 is a diagram illustrating the structure of the advertisement delivery management apparatus 1 according to the embodiment. As illustrated in FIG. 2, the advertisement delivery management apparatus 1 includes a communication unit 10, an advertising information DB 11, a user information DB 12, a past log DB 13, a future log DB 14, and a control unit 15. The control unit 15 includes an advertisement delivery unit 21, a future log prediction unit 22, an accepting unit 23, and an allocation unit 24.

The communication unit 10 is an interface, such as a network interface card (NIC). The control unit 15 transmits and receives various kinds of information to and from the advertiser terminal 3 or the user terminal 4 through the communication unit 10 and the communication network 5. The advertising information DB 11, the user information DB 12, the past log DB 13, and the future log DB 14 are each a semiconductor memory device, such as a hard disk, a random access memory (RAM), or a flash memory, or a storage device, such as an optical disk.

The control unit 15 is implemented by an integrated circuit, such as an application specific integrated circuit (ASIC) or a field programmable gate array (FPGA). A central processing unit (CPU) or a micro processing unit (MPU) executes a program stored in the storage device using the RAM as a work area to cause the control unit 15 to function as the advertisement delivery unit 21, the future log prediction unit 22, the accepting unit 23, and the allocation unit 24. The structure of the control unit 15 is not limited thereto, but the control unit 15 may have any structure as long as it can perform the following information processing.

For Advertisement Delivery Unit 21

When a request to deliver advertising information is received from the user terminal 4, the advertisement delivery unit 21 acquires advertising information corresponding to the user attributes of the user of the user terminal 4 from an advertising information table in the advertising information DB 11 and transmits the acquired advertising information from the communication unit 10 to the user terminal 4 which is a delivery request source.

FIG. 3 is a diagram illustrating an example of the advertising information table stored in the advertising information DB 11. As illustrated in FIG. 3, the advertising information table includes information in which "user attributes", a "posting period", "the number of postings", and "advertising information" are associated with each other for each "advertisement ID".

The "advertisement ID" is identification information which is allocated to each accepted order request. The "user attributes" are user attributes designated by the order request. The "posting period" is the period for which the advertising information designated by the order request is delivered. The "number of postings" is the number of deliveries of the advertising information designated by the order request. In addition, the "advertising information" is advertising information designated by the order request.

For example, an advertisement ID "A0001" indicates that the user attribute of a delivery target is a "vehicle", the delivery period of advertising information is "from Jan. 1, 2013 to Jan. 31, 2013", the number of times the advertising information is delivered is "1000", and the advertising information is a "banner advertisement Ya". When the number of deliveries of the advertising information is greater than "1000" within the delivery period of the advertising information, the process of delivering the advertising information corresponding to the order request ends.

When the user of the user terminal 4 who transmitted the advertising information delivery request has the user attribute "vehicle", for example, the advertisement delivery unit 21 acquires the advertising information "banner advertisement Ya" of the advertisement ID "A0001" from the advertising information table in the advertising information DB 11 and transmits the acquired advertising information to the user terminal 4 which is a delivery request source.

The user attributes of the user of the user terminal 4 are determined on the basis of the user information table in the user information DB 12. FIG. 4 is a diagram illustrating an example of the user information table stored in the user information DB 12. As illustrated in FIG. 4, the user information table includes information, such as a "user ID", "psychographic attributes", and "demographic attributes".

The "user ID" is identification information for identifying the user of the user terminal 4. The "user ID" corresponds to, for example, user identification information which is set to a hypertext transfer protocol (HTTP) cookie transmitted and received between the advertisement delivery management apparatus 1 and the user terminal 4.

The "psychographic attributes" are information indicating, for example, the values, lifestyle, character, and preference of the user. The "psychographic attributes" are classified into, for example, attributes "vehicle", "cosmetics", "clothes", and "travel". In the example illustrated in FIG. 4, "1" is set to each attribute when the preference of the user is a relatively high and "0" is set to each attribute in the other cases. In addition, the "psychographic attributes" are not limited to the attributes illustrated in FIG. 4, but may include various attributes, such as economy, politics, baseball, soccer, other sports, sweets, a personal computer, white goods, and furniture.

The "demographic attributes" indicate demographic user attribute information. The "demographic attributes" are classified into, for example, attributes "sex" and "age" of the user. In FIG. 4, "1" is stored in the attribute "sex" when the user is a female and "2" is stored in the attribute "sex" when the user is a male. The age of the user is stored in the attribute "age". The "demographic attributes" are not limited to the attributes illustrated in FIG. 4, but may include various attributes, such as the job, family structure, annual income, address, native place, and academic background of the user.

For example, when the user with a user ID "U0001" illustrated in FIG. 4 transmits an advertising information delivery request from the user terminal 4, it is determined that the user attributes of the user are, for example, "vehicle", "travel", "male", and "21 years old". In addition, for example, when the user with a user ID "U0002" illustrated in FIG. 4 transmits an advertising information delivery request from the user terminal 4, the advertisement delivery unit 21 determines that the user attributes of the user are "clothes", "female", and "44 years old".

The advertisement delivery unit 21 sets the user ID of the user who transmits the advertising information delivery request in an access log table in the past log DB 13. FIG. 5 is a diagram illustrating an example of the access log table stored in the past log DB 13.

As illustrated in FIG. 5, the access log table is a table in which that associates the date and time when the user transmits the advertisement information delivery request to the advertisement delivery management apparatus 1 with the user ID is set. The advertisement delivery unit 21 updates the access log table whenever the advertising information delivery request is received from the user terminal 4.

When a request to transmit advertising information to the user terminal 4 is received from the information delivery apparatus 2, similarly the advertisement delivery unit 21 acquires advertising information corresponding to the user attributes of the user of the user terminal 4 from the advertising information table in the advertising information DB 11 and transmits the acquired advertising information from the communication unit 10 to the user terminal 4. The transmission request from the information delivery apparatus 2 includes the user ID of the user of the user terminal 4. The advertisement delivery unit 21 acquires advertising information corresponding to the user attributes of the user of the user terminal 4 from the advertising information table on the basis of the user ID.

For Future Log Prediction Unit 22

The future log prediction unit 22 determines a plurality of delivery target users who are predicted as the future advertisement delivery destinations on the basis of the access log table stored in the past log DB 13 and sets the user information of the determined delivery target users in a future log table stored in the future log DB 14.

FIG. 6 is a diagram illustrating an example of the future log table stored in the future log DB 14. As illustrated in FIG. 6, information (hereinafter, referred to as a future log in some cases) on the delivery target user who is predicted as the advertisement delivery destination for a predetermined period in the future is set in the future log table. The future log table illustrated in FIG. 6 includes future log information, such as a "delivery target ID", an "allocation state", "psychographic attributes", and "demographic attributes".

The "delivery target ID" is identification information allocated to each delivery target user who is predicted as the future advertisement delivery destination. The delivery target user is a virtual user who is different from the user set in the user information table stored in the user information DB 12.

The "allocation state" is information indicating whether the delivery target user has been allocated to the order request. When a delivery target user (hereinafter, referred to as an allocated user in some cases) has been allocated to the order request, "1" is set to the "allocation state". When a delivery target user (hereinafter, referred to as a non-allocated user in some cases) has not been allocated for the order request, "0" is set to the "allocation state".

The "psychographic attributes" and the "demographic attributes" are the same as those in the user information table in the user information DB 12. The user who is set in the user information table may be presumed as the delivery target user and the delivery target ID may be used as the user ID. In this case, information on the "psychographic attributes" and the "demographic attributes" can be acquired from the user information table on the basis of the user ID.

The future log prediction unit 22 can predict the delivery target user who will be the advertisement delivery destination for a predetermined future period on the basis of, for example, the access log in the same period last year or the access log in the previous predetermined period. For example, the future log prediction unit 22 can presume the user who transmitted the advertising information delivery request for the last month as the delivery target user for the next month.

The future log prediction unit 22 can perform a statistical process for the past log which is set in the access log table to determine the tendency of the delivery target user who will be the future advertisement delivery destination and predict the future log on the basis of the determination result. In this case, for example, the future log prediction unit 22 may determine the tendency of the delivery target user, considering, for example, weather or temperature change information.

The future log prediction unit 22 can set the predicted future log in the future log table. In addition, the future log prediction unit 22 may set the future log which is acquired from an external apparatus through the communication unit 10 in the future log table.

In addition, a plurality of future log prediction units 22 which predict the delivery target users according to different rules may be provided. In this case, it is possible to acquire information on a plurality of different future logs (hereinafter, referred to as prediction patterns in some cases).

For Accepting Unit 23

The accepting unit 23 determines whether to accept the order request from the advertiser terminal 3 on the basis of the future log set in the future log table. When it is determined that the order request is accepted, the accepting unit 23 transmits a response to the reception of the order to the advertiser terminal 3. As described above, the order request from the advertiser terminal 3 includes designated information, such as the user attributes and the number of postings.

The accepting process of the accepting unit 23 includes, for example, a process of acquiring the delivery target user group, a process of determining whether each delivery target user group satisfies the delivery conditions designated by the order request, and a process of determining whether to accept the order request. Hereinafter, each process will be described specifically.

Acquisition Process of Accepting Unit 23

First, the process of acquiring the delivery target user group will be described. In the process, the accepting unit 23 repeatedly performs a process of randomly selecting a predetermined ratio R1 of the non-allocated users to the non-allocated users included in the future log table to acquire information on two or more types of delivery target user groups.

For example, it is assumed that the number of non-allocated users in the future log table is "1000" and the predetermined ratio R1 is set to "0.08". In this case, the accepting unit 23 repeatedly performs the process of selecting the non-allocated users from the future log table 800 times (=1000×0.8) m times (m is an integer equal to or greater than 2).

In this way, the accepting unit 23 can acquire information on m delivery target user groups, each including "800" non-allocated users, from the future log table. Whenever the predetermined ratio R1 of the non-allocated users is selected, the accepting unit 23 sets the selected non-allocated users as a delivery target user group in the delivery target user group table. FIG. 7 is a diagram illustrating an example of the delivery target user group table.

In this way, it is possible to easily generate different future logs (prediction patterns) on the basis of the future log table. That is, when the future log prediction unit 22 generates two or more types of future logs, two or more types of different prediction rules are needed. However, the delivery target user is sampled from the future log table to prevent an increase in the number of prediction rules in the future log prediction unit 22.

Since the delivery target user is sampled from the future log table, the delivery target user group acquired by the accepting unit 23 is associated with the delivery tendency of the user attributes in the future log table. Therefore, for example, when the prediction accuracy of the future log prediction unit 22 is high, it is possible to accept the order request with high accuracy in the reception determination process.

As the number of delivery target users forming the delivery target user group is reduced, the association of the delivery target users with the delivery tendency of the user attributes in the future log table is reduced, which makes it possible to change the association between the prediction patterns, depending on the number of non-allocated users. Therefore, as the number of delivery target users is reduced, a process of determining whether the delivery conditions are satisfied, which will be described below, becomes stricter. As a result, it is possible to accept the order request with high accuracy in the reception determination process.

The predetermined ratio R1 can be set to the control unit 15 by the administrator of the advertisement delivery management apparatus 1 through an operation unit (not illustrated). In addition, the accepting unit 23 may change the predetermined ratio R1, depending on the number of non-allocated users in the future log table.

For example, when the number of non-allocated users in the future log table is relatively large, the accepting unit 23 increases the predetermined ratio R1. When the number of non-allocated users in the future log table is relatively small, the accepting unit 23 decreases the predetermined ratio R1. In this way, it is possible to improve the accuracy of the accepting process.

In the process of acquiring the delivery target user group, the accepting unit 23 may select the delivery target user according other different rules, instead of randomly selecting the delivery target user. For example, the accepting unit 23 can randomly remove a predetermined ratio R3 (=1−R1) of the non-allocated users to the non-allocated users included in the future log table and form the delivery target user group with the remaining non-allocated users.

For example, the accepting unit 23 may acquire, as the delivery target user group, the non-allocated users except for a plurality of k-th (1≤k≤m) rows among rows of the non-allocated users in the future log table. For example, it is assumed that the predetermined ratio R1 is "0.8" and m is "10".

In this case, the accepting unit 23 excludes the non-allocated users which are set in the rows in which the last digit is "1" and "2", such as the third to tenth tows, the thirteenth to twentieth rows . . . , for the first delivery target user group in the future log table. In addition, the accepting unit 23 excludes the non-allocated users which are set in the rows in which the last digit is "2" and "3", such as the first row, the fourth to tenth rows, the eleventh row, the fourteenth to twentieth rows . . . , for the second delivery target user group in the future log table.

The accepting unit 23 may repeatedly perform a process of randomly selecting the predetermined ratio R1 of the non-allocated users to the non-allocated users included in the future log table and multiplying the selected non-allocated users by a predetermined coefficient K1 (>1) to acquire information on two or more types of delivery target user groups. The accepting unit 23 sets the predetermined coefficient K1 to, for example, 1/R1. The predetermined ratio R1 is preferably set such that the predetermined coefficient K1 is an integer when the predetermined coefficient K1 is 1/R1.

As such, when the predetermined coefficient K1 is multiplied, the accepting unit 23 can accurately set the delivery target user group corresponding to the number of non-allocated users included in the future log table. When the predetermined coefficient K1 which is not an integer is multiplied, there is a concern a decimal fraction will be included in the number of non-allocated users forming the delivery target user group. Therefore, the accepting unit 23 can round off, cut off, or round up a value obtained by multiplying the number of non-allocated users forming the delivery target user group by the predetermined coefficient K1, on the basis of, for example, predetermined conditions. In this way, the total number of non-allocated users forming each delivery target user group can be equal or substantially equal to the total number of non-allocated users in the future log table.

As described above, when a plurality of future log prediction units 22 generate two or more types of future logs, the accepting unit 23 can acquire the two or more types of future logs as two or more types of delivery target user groups with no change from the future log prediction unit 22.

Satisfaction Determination Process of Accepting Unit 23

Next, a process of determining whether each delivery target user group satisfies the delivery conditions designated by the order request will be described. In the process, the accepting unit 23 determines whether two or more types of delivery target user groups each satisfy the delivery conditions designated by the advertisement delivery order request.

Specifically, the accepting unit 23 counts the number of delivery target users with the user attributes designated by the order request among the delivery target users in the delivery target user group. When the count result is equal to or greater than the number of postings designated by the order request, the accepting unit 23 determines that the delivery conditions designated by the order request are satisfied.

For example, when the user attribute designated by the order request is "vehicle" and the number of postings is "1000", the accepting unit 23 counts the number of delivery target users with the attribute "vehicle" to which "1" is set among the delivery target users in each delivery target user group. When the count result is equal to or greater than "1000", the accepting unit 23 determines that the delivery target user group satisfies the delivery conditions designated by the order request. When the count result is less than "1000", the accepting unit 23 determines that the delivery target user group does not satisfy the delivery conditions designated by the order request.

The accepting unit 23 counts a combination of two or more user attributes whose frequency is designated by the order request and is equal to or greater than a threshold value as one user attribute (hereinafter, referred to as a combined user attribute in some cases). For example, when the frequency of a combination of the user attributes "clothes" and "travel" which is designated by the order request is high, the accepting unit 23 counts the combination of the user attributes "clothes" and "travel" as one user attribute.

Information on the order request accepted by the accepting unit 23 is set in the advertising information table stored in the advertising information DB 11. The accepting unit 23 can determine a combination of two or more user attributes whose frequency is designated by the order request and is equal to or greater than a threshold value on the basis of the advertising information table.

For example, the accepting unit 23 determines the total number of postings designated by the past order request as a first sum on the basis of the advertising information table and determines the total number of postings designated by the past order request as a second sum for each combination of two or more user attributes. Then, the accepting unit 23 counts, as one user attribute, a combination of the user attributes in which the ratio of the second sum to the first sum is equal to or greater than a predetermined threshold value.

When the frequency of the combination of the user attributes "clothes" and "travel" which is designated by the order request is high and the future log table is in the state illustrated in FIG. 6, the user attribute of the delivery target user with a delivery target ID "F0002" is not "clothes" or "travel", but is "clothes & travel".

The combination of two or more user attributes whose frequency is designated by the order request and is equal to or greater than a threshold value may not be determined by the accepting unit 23, but may be set in a separate user information DB 12 by an external apparatus.

For example, when the number of non-allocated users in the future log table is equal to or less than a predetermined value or when the number of non-allocated users with the combined user attribute is equal to or less than a predetermined value, the accepting unit 23 can divide the combined user attribute into a plurality of user attributes. Therefore, it is possible to increase the total number of user attributes. As a result, the possibility that the order request designating the combined user attribute will be accepted is reduced, but it is possible to increase the possibility that other order requests will be accepted.

Reception Determination Process of Accepting Unit 23

Next, a process of determining whether to accept the order request will be described. In the process, the accepting unit 23 determines whether to accept the advertisement delivery order request on the basis of the above-mentioned satisfaction determination process.

Specifically, when the ratio of the delivery target user groups satisfying the delivery conditions to the two or more types of delivery target user groups is equal to or greater than the predetermined value R2, the accepting unit 23 accepts the advertisement delivery order request. For example, in a case in which the number of delivery target user groups is "10" and the predetermined value R2 is "0.8", when the number of delivery target user groups satisfying the delivery conditions is equal to or greater than "8", the accepting unit 23 accepts the advertisement delivery order request.

The predetermined value R2 can be set in the control unit 15 by the administrator of the advertisement delivery management apparatus 1 through the operation unit (not illustrated). In addition, the accepting unit 23 may change the predetermined value R2 depending on the number of non-allocated users in the future log table.

For example, when the number of non-allocated users in the future log table is relatively large, the accepting unit 23 decreases the predetermined value R2. When the number of non-allocated users in the future log table is relatively small, the accepting unit 23 increases the predetermined value R2. In this way, it is possible to perform the accepting process with high accuracy.

In the above description, the accepting unit 23 selects the delivery target users forming the delivery target user group from the non-allocated users in the future log table. However, the accepting unit 23 may select the delivery target users forming the delivery target user group from all of the delivery target users in the future log table. Here, "all of the delivery target users" are delivery target users including both the allocated users and the non-allocated users. When the number of non-allocated users is "2000" and the number of allocated users is "8000", the number of all delivery target users is "10000".

In this case, the accepting unit 23 processes the accepted order requests and a new advertisement delivery order request from the advertiser terminal 3 as one order request. For example, it is assumed that the accepted order requests are order requests with advertisement IDs "A0001" to "A0003" illustrated in FIG. 3. In addition, it is assumed that, in a new order request, the designated user attributes is "vehicle" and the designated number of postings is "1000".

The accepting unit 23 determines a delivery target user group in which the number of delivery target users with the user attribute "vehicle" is equal to or greater than "1000", a delivery target user group in which the number of delivery target users with the user attribute "vehicle & travel" is equal to or greater than "2000", and a delivery target user group in which the number of delivery target users with the user attribute "male & twenties" is equal to or greater than "1500" as the delivery target user groups which satisfy the delivery conditions designated by the order request.

For Allocation Unit 24

Whenever the accepting unit 23 accepts an advertisement delivery order request, the allocation unit 24 allocates the delivery target user to the order request. The allocation process determines an allocation score corresponding to the allocation state of the delivery target user set in the future log table in response to the order request and minimizes a reduction in the allocation score before and after the allocation of the delivery target user in response to a new advertisement delivery order request. The allocation unit 24 uses the combined user attribute as one user attribute, similarly to the accepting unit 23.

First, the allocation score will be described. The allocation unit 24 counts the "total number of user attributes" of the non-allocated users among a plurality of delivery target users set in the future log table illustrated in FIG. 6. The non-allocated user is a delivery target user for which "0" is set to the "allocation state" in the future log table.

The "total number of user attributes" is the sum of the "number of user attributes" of the non-allocated users. For example, when the number of non-allocated users is 1000, the sum of the "number of user attributes" of 1000 non-allocated users is the "total number of user attributes".

The "number of user attributes" is the number of delivery target users which are effectively set according to each classified user attribute. In the case of the "psychographic attributes", the attributes mean, for example, "vehicle", "cosmetics", "clothes", and "travel". In the case of the "demographic attributes", the attributes mean, for example, "sex" and "age".

In the case of the "psychographic attributes" the effectively set delivery target user is a delivery target user for which "1" is set to the corresponding attributes. In the case of the "demographic attributes", the effectively set delivery target user is a delivery target user for which information is set to the attributes.

For example, it is assumed that the "psychographic attributes" are classified into only four attributes, such as "vehicle", "cosmetics", "clothes", and "travel" and the "demographic attributes" are classified into only two attributes, such as "sex" and "age". In this case, the maximum value of the "number of user attributes" is "6".

In the example illustrated in FIG. 6, the delivery target users who are not allocated to the order request are delivery target users with delivery target IDs "F0001", "F0003", "F0004", and "F0006". In this case, as illustrated in FIG. 8, the "numbers of user attributes" of the delivery target users corresponding to the delivery target IDs "F0001", "F0003", "F0004", and "F0006" are "4", "2", "3", and "6", respectively. Therefore, as illustrated in FIG. 8, the "total number of user attributes", which is the sum of the "number of user attributes" of the delivery target users who are not allocated to the order request, is "15 (=4+2+3+6)" and the allocation score is "15".

The allocation unit 24 may use the "total number of user attributes" included only in the "psychographic attributes" as the allocation score. In addition, the allocation unit 24 may use the "total number of user attributes" included only in the "demographic attributes" as the allocation score. The allocation unit 24 may use the "total number of user attributes" included only in a portion of the "psychographic attributes" or the "demographic attributes" as the allocation score.

In addition, the "total number of user attributes" may not be used as the allocation score, but other indexes may be used as the allocation score. For example, the allocation unit 24 may use the minimum number or ratio of non-allocated users with the user attributes as the allocation score.

Next, the allocation of the delivery target users in response to a new advertisement delivery order request will be described. The allocation unit 24 selects the non-allocated users who have the user attributes designated by a new advertisement delivery order request and correspond to the number of postings designated by the order request from the future log table and determines a reduction in the allocation score before and after the selected non-allocated users are allocated to the order request.

There are a plurality of combinations of the non-allocated users corresponding to the number of postings which is designated by the order request except in the case in which only the number of non-allocated users with the user attributes designated by the advertisement delivery order request which corresponds to the number of postings designated by the order request is set in the future log table. For example, when the number of non-allocated users with the user attributes designated by the advertisement delivery order request is "10" and the number of non-allocated users corresponding to the number of postings designated by the order request is "5", the number of combinations of the non-allocated users is "252".

The allocation unit 24 determines combinations of the non-allocated users where a reduction in the allocation score is the minimum before and after all combinations of the non-allocated users corresponding to the number of postings designated by the order request are allocated to the order request. Then, the allocation unit 24 selects combinations of the non-allocated users which are determined to have the minimum reduction in the allocation score and allocates the selected combinations to the order request.

In addition, the allocation unit 24 may select one of the delivery target user groups which are determined to satisfy the delivery conditions by the accepting unit 23 and perform an allocation process such that a reduction in the allocation score is the minimum before and after the delivery target users are allocated to the order request among the non-allocated users forming the selected delivery target user group. In this case, it is possible to reduce the number of combinations of the non-allocated users used to determine the allocation score in the allocation process and reduce the processing load of the allocation unit 24.

In this case, for example, the allocation unit 24 can allocate, to the order request, a delivery target user group with the largest number of user attributes designated by the order request among the delivery target user groups which are determined to satisfy the delivery conditions by the accepting unit 23. In this way, it is possible to appropriately allocate the delivery target user while reducing the processing load of the allocation unit 24.

3. Process Flow of Advertisement Delivery Management Apparatus 1

Next, the procedure of an advertisement delivery management process of the advertisement delivery management apparatus 1 according to an embodiment will be described. FIG. 9 is a diagram illustrating an example of the flow of the advertisement delivery management process of the advertisement delivery management apparatus 1 according to the embodiment. The flow of the advertisement delivery management process starts when an advertisement delivery order request is transmitted by the advertiser terminal 3.

When the communication unit 10 receives the advertisement delivery order request from the advertiser terminal 3, the control unit 15 of the advertisement delivery management apparatus 1 performs a process of acquiring the delivery target user group, as illustrated in FIG. 9 (Step S11). In the process, the control unit 15 repeatedly performs a process of selecting the delivery target user from the future log table stored in the future log DB 14 according to a predetermined rule to acquire information on two or more types of delivery target user groups.

Then, the control unit 15 performs a delivery condition satisfaction process (Step S12). In the process, the control unit 15 determines whether two or more types of delivery target user groups each satisfy the delivery conditions designated by the advertisement delivery order request.

Then, the control unit 15 determines whether the advertisement delivery order request can be accepted (Step S13). In the process, the control unit 15 determines that the advertisement delivery order request can be accepted when the ratio of the delivery target user groups satisfying the delivery conditions to the two or more types of delivery target user groups acquired in Step S11 is equal to or greater than a predetermined value.

When it is determined that the advertisement delivery order request can be accepted (Step S13; Yes), the control unit 15 sets information included in the order request to the advertising information table to update the advertising information table (Step S14). Examples of the information included in the order request include user attributes, an posting period, the number of postings, and advertising information. These information items are set in the advertising information table.

Then, the control unit 15 performs a process of allocating the delivery target user (Step S15). The non-allocated user with the user attribute designated by the order request is allocated to the order request by the allocation process.

Then, the control unit 15 updates the future log table on the basis of the result of the allocation process in Step S15 (Step S16). Specifically, the control unit 15 updates the non-allocated user who is allocated to the order request among the non-allocated users set in the future log table to the allocated user. The "allocation state" is changed from "0" to "1" to update the non-allocated user to the allocated user.

Then, the control unit 15 transmits a response to the reception of the order to the advertiser terminal 3 through the communication unit 10 (Step S17) and ends the advertisement delivery management process. On the other hand, when it is determined in Step S13 that the order request cannot be accepted from the advertiser terminal 3 (Step S13; No), the control unit 15 transmits an order rejection response to the advertiser terminal 3 through the communication unit 10 (Step S18) and ends the advertisement delivery management process.

4. Modifications

In the above-described embodiment, the accepting unit 23 accepts the advertisement delivery order request when the ratio of the delivery target user groups which are determined to satisfy the delivery conditions by the determination unit to two or more types of delivery target user groups is equal to or greater than a predetermined value. However, the embodiment is not limited to the above-mentioned reception determination process. For example, the accepting unit 23 may accept the advertisement delivery order request on the basis of the satisfaction rate of each delivery target user group for the delivery conditions.

For example, it is assumed that the numbers of delivery target users with the user attribute "vehicle" in the first to third delivery target user groups are "2000", "1400", and "1000", respectively, and the delivery conditions are that the number of times the user attribute "vehicle" is delivered is "1500".

In this case, the satisfaction rate of the first delivery target user group for the delivery conditions is 1.25 (=2000/1500), the satisfaction rate of the second delivery target user group for the delivery conditions is 0.93 (=1400/1500), and the satisfaction rate of the third delivery target user group for the delivery conditions is 0.67 (=1000/1500).

Therefore, the average of the satisfaction rates of the first to third delivery target user groups for the delivery conditions is 0.95. When the average of the satisfaction rates is equal to or greater than a predetermined value R4 (for example, 0.9), the accepting unit 23 can determine to accept the advertisement delivery order request.

When the ratio of the delivery target user groups satisfying the delivery conditions to two or more types of delivery target user groups is in a predetermined range (for example, 0.8 to 0.9), the accepting unit 23 may determine the average of the satisfaction rates of the delivery target user groups for the delivery conditions. In this case, when the average of the satisfaction rates is the predetermined value R4, the accepting unit 23 can determine to accept the advertisement delivery order request.

In the above description, the predetermined ratio R1 or the predetermined value R2 can be changed depending on the settings of the advertisement delivery management apparatus 1 by the administrator or the number of non-allocated users in the future log table. However, the predetermined ratio R1 or the predetermined value R2 may be changed depending on other factors. For example, the predetermined ratio R1 or the predetermined value R2 may be changed on the basis of the coincidence (hereinafter, referred to as the coincidence of prediction) between the future log predicted by the future log prediction unit 22 and the user attributes of the user to which advertising information is actually delivered.

For example, when the coincidence of prediction is low, the predetermined ratio R1 or the predetermined value R2 is reduced. When the coincidence of prediction is high, the predetermined ratio R1 or the predetermined value R2 is increased. In this way, it is possible to accept the order request with high accuracy.

5. Effects

In the advertisement delivery management apparatus 1 according to the embodiment, the accepting unit 23 (corresponding to an example of an acquisition unit) acquires information on two or more types of delivery target user groups, each including a plurality of delivery target users predicted as the future advertisement delivery destinations, and the accepting unit 23 (corresponding to an example of a determination unit) determines whether each of the two or more types of delivery target user groups satisfies the delivery conditions designated by the advertisement delivery order request. Then, the accepting unit 23 (corresponding to an example of an accepting unit) accepts the advertisement delivery order request on the basis of the determination result.

According to this structure, the process of determining whether the advertisement delivery conditions are satisfied can be performed for a plurality of prediction patterns. Therefore, it is possible to improve the reception accuracy of an order request, as compared to a case in which the determination process is performed for one prediction pattern. As a result, it is possible to prevent loss of sales opportunities and prevent the reception of an order request which is not capable of being actually accepted.

The accepting unit 23 accepts the advertisement delivery order request when the ratio of the delivery target user groups satisfying the delivery conditions to the two or more types of delivery target user groups is equal to or greater than a predetermined value.

According to this structure, it is possible to further improve the reception accuracy of an order request. That is, as the number of delivery target user groups increases, the ratio of the delivery target user groups satisfying the delivery conditions designated by the order request is reduced. As a result, there is a concern that the reception accuracy of the order request will be reduced. However, it is possible to improve the reception accuracy of the order request by adjusting the predetermined value.

The future log prediction unit 22 (corresponding to an example of a prediction unit) predicts a plurality of delivery target users as the future advertisement delivery destinations and the accepting unit 23 repeatedly performs a process of selecting a predetermined ratio of the delivery target users to the plurality of delivery target users according to a predetermined rule to acquire information on the two or more types of delivery target user groups.

According to this structure, it is possible to easily acquire different prediction patterns. Since these prediction patterns are acquired from one prediction pattern predicted by the future log prediction unit 22, they can be associated with the delivery tendency of the user attributes. When the prediction accuracy of the future log prediction unit 22 is high, it is possible to Improve the reception accuracy of the order request.

The predetermined rule according to which the accepting unit 23 selects the delivery target user is a rule that randomly selects a predetermined number of delivery target users from a plurality of delivery target users.

According to this structure, it is possible to easily acquire different prediction patterns.

In addition, a plurality of future log prediction units 22 (corresponding to an example of a prediction unit) predict a plurality of delivery target users as the future advertisement delivery destinations according to different rules and the accepting unit 23 acquires information on the plurality of delivery target users predicted by the plurality of future log prediction units 22 as information on the two or more types of delivery target user groups.

According to this structure, even when the prediction accuracy of each future log prediction unit 22 is low, it is possible to accept an order request with high accuracy.

The order request delivery conditions include information for designating one or more user attributes and information on the number of deliveries. The accepting unit 23 determines that the delivery target user group satisfies the delivery conditions when the number of delivery target users with the user attribute designated by the delivery conditions among a plurality of delivery target users in the delivery target user group is equal to or greater than the number of deliveries designated by the delivery conditions.

According to this structure, it is possible to accurately determine whether the delivery conditions are satisfied, considering the user attributes or the number of deliveries designated by the order request.

The accepting unit 23 determines the number of delivery target users, using a combination of two or more user attributes whose frequency is designated by the advertisement delivery order request and is equal to or greater than a threshold value as one user attribute.

According to this structure, it is possible to count the number of delivery target users, using a combination of two or more user attributes whose frequency is designated by the order request and is equal to or greater than a threshold value as one user attribute. Therefore, it is possible to increase the possibility of the future advertisement delivery order being accepted and prevent loss of sales opportunities.

6. Others

The advertisement delivery management apparatus 1 may be implemented by a plurality of server computers. In addition, the structure of the advertisement delivery management apparatus 1 may be flexibly changed depending on the functions. For example, an external platform may be called by an application programming interface (API) or network computing and then executed to implement the advertisement delivery management apparatus 1. The advertisement delivery management apparatus 1 and the information delivery apparatus 2 may be implemented by one server computer.

According to the embodiment, it is possible to provide an advertisement delivery management apparatus and an advertisement delivery management method which can perform a process of accepting an advertisement delivery order with high accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An advertisement delivery management apparatus communicating with an advertiser terminal through a communication network, the advertisement delivery management apparatus comprising:

a memory storing user information of each of a plurality of delivery target users predicted as future advertisement delivery destinations, the information including at least one user attribute of each of the plurality of delivery target users and an allocation state of each of the plurality of delivery target users to an advertisement delivery order request; and a processor operatively coupled with the memory, the processor being programmed to:

receive the advertisement delivery order request designating predetermined delivery conditions from the advertiser terminal, the predetermined delivery conditions including information designating at least one user attribute and a number of deliveries;

acquire information on at least two delivery target user groups from the memory, each of the at least two delivery target user groups including a predetermined number of delivery target users that are not allocated to the advertisement delivery order request, the at least two delivery target user groups having different combinations of delivery target users;

determine that each of the at least two delivery target user groups satisfies the predetermined delivery conditions designated by the advertisement delivery order request when a number of delivery target users having the user attributes designated by the delivery conditions among the plurality of delivery target users in each of the at least two delivery target user groups is equal to or greater than the number of deliveries designated by the delivery conditions; and accept the advertisement delivery order request when a ratio of: (i) a number of the satisfactory delivery target user groups that are determined to satisfy the predetermined delivery conditions, and (ii) a number of the at least two delivery target user groups is equal to or greater than a predetermined ratio value, and do not accept the advertisement delivery order request when the ratio is less than the predetermined ratio value, in order to reduce the processing load on the processor.

2. The advertisement delivery management apparatus according to claim 1, wherein the processor is programmed to:

predict the plurality of delivery target users as the future advertisement delivery destinations; and repeatedly perform a process of selecting a predetermined ratio of the delivery target users to the plurality of delivery target users according to a predetermined rule to acquire the information on the at least two delivery target user groups.

3. The advertisement delivery management apparatus according to claim 2, wherein the predetermined rule is a rule that randomly selects a predetermined number of delivery target users from the plurality of delivery target users.

4. The advertisement delivery management apparatus according to claim 1, wherein the processor is programmed to:

predict the plurality of delivery target users as the future advertisement delivery destinations according to different rules; and acquire information on the predicted plurality of delivery target users as the information on the at least two delivery target user groups.

5. The advertisement delivery management apparatus according to claim 1, wherein the processor is programmed to determine the number of delivery target users based on a combination of at least two user attributes of which a frequency designated by the advertisement delivery order request is equal to or greater than a threshold value, which is set as one user attribute.

6. An advertisement delivery management method performed by a computer, the advertisement delivery management method comprising:

receiving an advertisement delivery order request designating predetermined delivery conditions from an advertiser terminal, the predetermined delivery conditions including information designating at least one user attribute and a number of deliveries;

acquiring information on at least two delivery target user groups, each of the at least two delivery target user groups including a predetermined number of delivery target users that are not allocated to the advertisement delivery order request, the at least two delivery target user groups having different combinations of delivery target users;

determining that each of the at least two delivery target user groups satisfies the predetermined delivery conditions designated by the advertisement delivery order request when a number of delivery target users having the user attributes designated by the delivery conditions among the plurality of delivery target users in each of the at least two delivery target user groups is equal to or greater than the number of deliveries designated by the delivery conditions; and accepting the advertisement delivery order request when a ratio of: (i) a number of the satisfactory delivery target user groups that are determined to satisfy the predetermined delivery conditions, and (ii) a number of the at least two delivery target user groups is equal to or greater than a predetermined ratio value, and not accepting the advertisement delivery order request when the ratio is less than the predetermined ratio value, in order to reduce the processing load on the processor.

7. The advertisement delivery management method according to claim 6, comprising:

predicting the plurality of delivery target users as the future advertisement delivery destinations; and repeatedly selecting a predetermined ratio of the delivery target users to the plurality of delivery target users according to a predetermined rule to acquire the information on the at least two delivery target user groups.

8. The advertisement delivery management method according to claim 7, wherein the predetermined rule is a rule that randomly selects a predetermined number of delivery target users from the plurality of delivery target users.

9. The advertisement delivery management method according to claim 6, further comprising:

predicting the plurality of delivery target users as the future advertisement delivery destinations according to different rules; and acquiring information on the predicted plurality of delivery target users as the information on the at least two delivery target user groups.

10. The advertisement delivery management method according to claim 6, further comprising:

determining the number of delivery target users based on a combination of at least two user attributes of which a frequency designated by the advertisement delivery order request is equal to or greater than a threshold value, which is set as one user attribute.

* * * * *